United States Patent [19]

Jacobson

[11] 4,222,192

[45] Sep. 16, 1980

[54] HANDLE AND REEL SEAT FOR A FISHING ROD

[75] Inventor: Hubert B. Jacobson, Plymouth, Ind.

[73] Assignee: Williams R. Harris, III, Plymouth, Ind. ; a part interest

[21] Appl. No.: 973,136

[22] Filed: Dec. 26, 1978

[51] Int. Cl.³ ............................................. A01K 87/06
[52] U.S. Cl. ....................................... 43/22; 43/23
[58] Field of Search ...................................... 43/22, 23

[56] References Cited

U.S. PATENT DOCUMENTS

| | | | |
|---|---|---|---|
| 3,006,098 | 10/1961 | Harke | 43/22 |
| 3,047,974 | 8/1962 | Stephens | 43/22 |
| 3,295,244 | 1/1967 | Kuntze | 43/22 |
| 3,310,904 | 3/1967 | Binlignat | 43/22 |
| 3,410,017 | 11/1968 | Wilson | 43/22 |
| 3,522,674 | 8/1970 | Hardesty | 43/22 |
| 3,616,565 | 11/1971 | Jung | 43/22 |
| 3,883,978 | 5/1975 | Ohmura | 43/22 |

Primary Examiner—Nicholas P. Godici
Attorney, Agent, or Firm—Woodard, Weikart, Emhardt & Naughton

[57] ABSTRACT

An improved handle and reel seat for a fishing rod comprising a single grippable handle member including a forward and a butt end thereon, the body member being elongated and having a continuous, generally circular outer surface in axial cross section. An opening in this outer surface connects with a first hidden inner cavity in the body member adapted to seat the reel feet on a T-shaped fishing reel support. A second cavity and matching slide member extend from the butt end of the body member and connect with this first cavity, with a butt cap and washer adapted to compress the slide member within this second cavity to securely support and seat the reel feet within the first cavity and opening.

6 Claims, 5 Drawing Figures

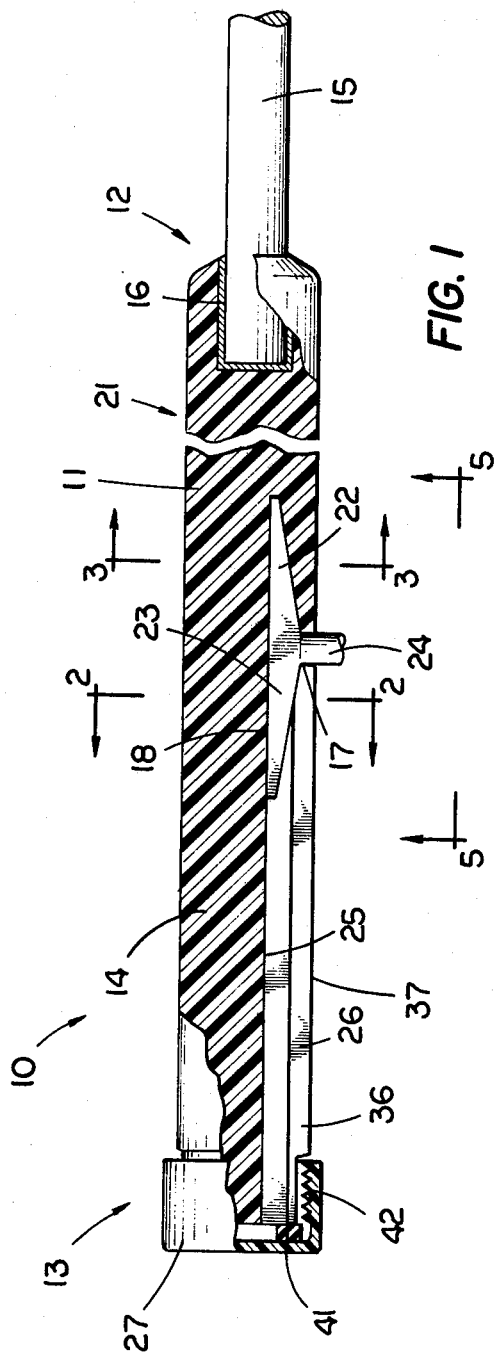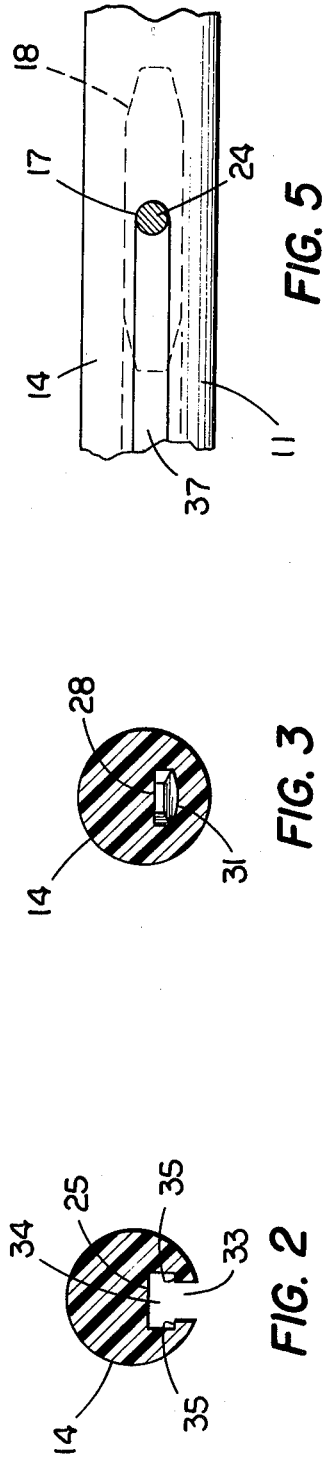

HANDLE AND REEL SEAT FOR A FISHING ROD

BACKGROUND OF THE INVENTION

This invention relates to fishing equipment and, particularly, to an improved handle and reel seat for use with a fishing rod.

Fishing has for centuries been a major source of food, income and sport for peoples around the world. This is true today, and is expected to remain true for centuries to come.

The equipment of today's fisherman is quite unlike that used in years gone by. Just as technological advancements have greatly changed many aspects of our daily lives, so too have they changed our fishing habits. For example, fishing reels have greatly advanced from the original single spool or bar used to wrap the line around by hand. There are now specialized bait casting reels, spin casting and conventional casting reels, automatic and single-action fly reels, and salt water, fresh water and ultralight open-face and skirted-spool spinning reels, to name but a few. Materials used include teflon and other synthetic discs, hard-chromed and tungsten carbide roller guides, aluminum, brass and synthetic gears, and stainless steel, brass and oil-impregnated bushings and ball bearings.

Accompanying these advancements in fishing reel technology have also come many changes in the original wood stick fishing rod. Rod blanks, as they are called, are now available in bamboo, solid glass, tubular fiber glass and the relatively new graphite composite constructions. These rod blanks are then outfitted with either roller guides for the fishing line or with conventional ring guides made of simple or hard-chromed stainless steel or tungsten carbide and possibly including agate or graphite composite inserts.

Rod handles and reel seats for attachment of these fishing reels have also undergone much change during this period. The major considerations behind these changes have been to provide a grip that is comfortable and structurally sturdy, and one that further securely seats the reel while being easily disassembled to store or replace the equipment. In this regard, rod handles and reel seats can be generally categorized in three groups:

First, handles are still available consisting of a single body portion (usually cork with an aluminum reinforcing tube) and having two metal rings to slip over the reel feet on the T-shaped bar support standard on most fishing reels. This handle is particularly adapted for use with spinning reels of the open-face or skirted-spool variety. However, it provides the major disadvantage that the rings often loosen and slide off the reel feet thereby releasing the reel while in use.

A second variety of rod handle includes a single body member having an exposed metal reel seat attachment somewhere along its length. In the case of spinning and fly rods, this reel seat generally comprises two metal rings which again slide over the ends of the reel feet. In this case, however, at least one locking ring is provided to screwably hold the single movable ring in place. The problem of reel slippage discussed above is thus not as significant with these handles, although it does occur. The exposed metal gripping portions of these handles, however, are often uncomfortable during long hours of use and get very cold during wintery weather.

The third type of handle design, only recently on the market, provides some form of hidden reel seat where the reel feet on the T-shaped support are secured inside the handle portion itself with no metal parts exposed. In all such handles presently available, this feature is accomplished by a twist-apart two-piece handle in which either the front or back portion untwists at the opening for the T-shaped bar to reveal the hidden reel seat. Examples of these handles include the "SUPER SPEED" Stick Spinning Rod marketed by the Lew Fuji Shimano Company, and the Fenwick and the Childre & Sons models mentioned on pages 115 of the February, 1977 issue of "Outdoor Life" magazine. It is noted, however, that the supposed Fenwick hidden seat handle, Design No. 10, was mentiond on page 16 of its 1977 catalog, but was excluded from its 1978 edition.

One further example of this new handle design is disclosed in Ohmura, U.S. Pat. No. 3,883,978. In this model, the back portion of the handle unscrews at the location of T-bar 3 to enable the reel to be properly seated.

Even these hidden-seat handles mentioned above have disadvantages during use. Although all previously exposed rings, screws and other metal parts are hidden, the exposed seam at the point of seating and gripping of the handle can provide discomfort and may also loosen during extended use. In addition, repeated locking and removal of the reel within the hidden seat may stretch or damage the rubber or other material at this seam thereby adding to the discomfort and possibly loosening the reel grip.

SUMMARY OF THE INVENTION

One embodiment of the present invention comprises an improved handle and reel seat for a fishing rod comprising a single grippable body member including a forward end and a butt end thereon, said body member being elongated and having a continuous, generally circular outer surface in axial cross section, the forward end including a fishing rod-receiving ferrule formed therein, an opening in the outer surface of said body member connecting with a first cavity therein and means for securely seating the reel feet on a T-shaped fishing reel support within said first cavity.

The above embodiment provides a significant improvement over present-day handle and reel seat designs. It incorporates the beneficial feature of a hidden reel seat with no exposed metal rings, screws or other parts from the present-day designs while also adding the important feature of a single grippable body member. The body and gripping area of the handle are thus a single piece and do not include a front and back portion which can loosen, become damaged, or provide discomfort at the seam formed at the T-shaped reel bar.

In one mode of practicing the above embodiment, the means for seating includes a second elongated cavity in the body member extending from the butt end thereof and connecting with the first cavity, a removable slide member slidable within this second cavity and a butt cap securely attachable to the butt end with the slide member retained therein and securely seating the reel feet within the first cavity. This mode provides further advantage over the present hidden-seat reel handles in that the securing portion is an end cap which is distant from the T-shaped bar and the gripping portion of the handle. The handle may further be formed with a reinforced outer layer of foam rubber or other comfortable material, or the entire body member may be molded from an appropriate synthetic material providing both structural support and comfort during use.

One object of the present invention is to provide an improved handle and reel seat for fishing rod which conceals the reel feet on the T-shaped bar support within the handle portion with no external seam at the seating gripping area to provide discomfort or instability during use.

Related objects and advantages of the present invention will be apparent from the following description.

BRIEF DESCRIPTION OF THE DRAWINGS

FIG. 1 is a part-sectioned side elevational view of the handle and reel seat comprising the preferred embodiment of the present invention with the reel feet on a T-shaped fishing reel support securely seated therein.

FIG. 2 is a cross-sectional view of the handle and reel seat in FIG. 1 taken along line 2—2.

FIG. 3 is a cross-sectional view of the handle and reel seat in FIG. 1 taken along line 3—3.

FIG. 5 is a part-sectioned view of the underside of the handle and reel seat in FIG. 1 taken along line 5—5.

DESCRIPTION OF THE PREFERRED EMBODIMENT

Figure 4:
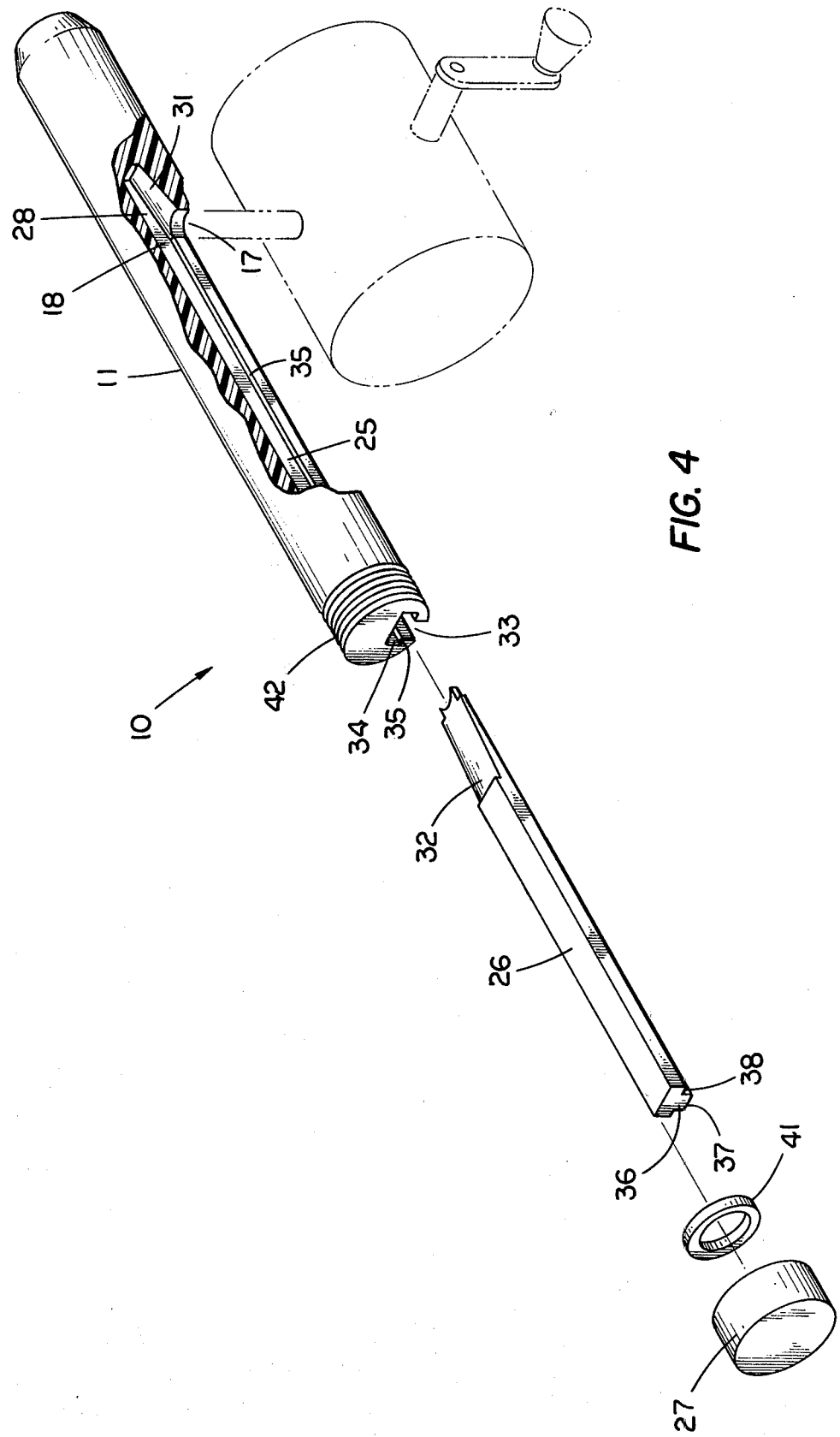
FIG. 4 is an exploded view of the handle and reel seat of the preferred embodiment, as depicted in FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, therein is depicted the handle and reel seat 10 comprising the preferred embodiment of the present invention. Handle 10 first includes a single grippable handle or body member 11 which includes a forward end 12 and a rearward, or butt, end 13. This one-piece, integral handle grip is of great importance to the present invention because of its continuous generally circular outer surface 14 when viewed in axial cross section as shown in FIGS. 2 and 3. By eliminating the use of front and back handle sections which join in a seam at the gripping location of the reel seat, the above embodiment constitutes a significant improvement over the existing prior art handles. It eliminates exposed metal screws, rings and other parts while also eliminating any external seams or joints near the gripping area thereby providing increased comfort and stability during use.

The forward end 12 of body member 11 includes some means for securely connecting to a fishing rod, or rod blank, 15. In this regad, "rod blank" is the term generally used to describe the elongated solid or tubular rod shaft before it is properly wrapped and outfitted with line guides. This means is usually a rod-receiving ferrule 16 formed in the forward end with the rod or blank cemented or otherwise secured in the ferrule.

An opening 17 is located at some point along the outer surface of body member 11 and connects with a first hidden internal cavity 18 formed therein. Means generally depicted by arrow 21 are then provided for securely seating the reel feet 22 and 23 on a T-shaped fishing reel support 24 within this first cavity. In this regard, this opening 17 is generally circular in appearance and need only be of a size sufficient to accomodate the long bar on a T-shaped reel support, as further described hereinbelow.

In handle 10 of the preferred embodiment, this means 21 first includes a second elongated cavity 25 in body member 11 extending from the butt end thereof to, and connecting with, first cavity 18. A removable slide member 26 is slidable within this second cavity; and a butt cap 27 is provided with means for securely attaching to the butt end of the body member with this slide member retained therein securely seating and supporting the reel feet within the first cavity.

To further properly seat the reel feet 22 and 23, first cavity 18 of the preferred embodiment includes a converging space 28 forward of the opening 17 which has an arcuate lower surface 31 adapted to seat the corresponding lower arcuate surface on front reel foot 22. Slide member 26 further includes a surface 32 sloped upwardly and rearwardly on its forward end, this surface being similarly arcuate to match the lower surface on rear foot 23. The length of slide member 26 is chosen to extend from butt end 13 to opening 17 thereby securely supporting rear foot 23 within the first cavity and against surfaces 30 and 32.

In this regard, the T-shaped fishing reel supports and reel feet on the great majority of spinning and other reels now available have standardized shapes and dimensions to enable the reels to be interchangeably used with the wide variety of available rods and handles. Therefore, although the dimensions of opening 17 and cavitie 18 and 25 may be varied to meet specific needs as with certain oversized salt water reels, one size will fit the great majority of present-day fishing reels. Moreover, any such changes shape or dimension are clearly within both the scope and contemplation of this invention as described and claimed herein. In this regard, body member 11 of the preferred embodiment is 1.5 inches in cross-sectional diameter with the internal cavities proportionately sized as shown in the accompanying drawing figures.

In preferred handle 10, second cavity 25 further includes an elongated slot 33 in the outer surface 14 extending from the butt end to opening 17. This slot is more narrow than main portion 34, as shown in FIG. 2, and defines two opposing ledges 35 extending the length of the cavity. Preferred slide member 26 has a corresponding outwardly projecting portion 36 sized to fit within slot 33. The outer surface 37 of this portion has an arcuate shape matching the curvature of the generally circular outer surface 14 of body member 11 thereby minimizing the discontinuity of the outer surface and further minimizing any discomfort to the user. This portion 36 also defines two surfaces 38 on the slide member which rest against ledges 35 thus securing the slide in cavity 25.

Preferred handle 10 further includes a compressible rubber washer 41. This washer is compressible between the butt cap 27 and butt end 13 and serves to compress and retain the slide within second cavity 25 thereby securely seating reel feet 22 and 23 when the butt cap is attached to the body member. In this regard, although a great variety of attaching means may be used, butt cap 27 of the preferred embodiment is screwably attached to butt end 13 by means of matching threads 42.

As to the material used to construct handle and reel seat 10, substantial variation is possible. Since one object of the present invention is to eliminate exposed metal surfaces in the gripping area, it is desirable that outer surface 14 of body member 11 be nonmetallic, such as wood, cork, foam rubber, plastic or some other synthetic material. This outer surface may be attached to a metal tubular-shaped inner form or core for structural reinforcement, with the internal structure of cavities 18 and 25 and slide member 26 being a formed metal such as aluminum or a molded plastic or other synthetic material. A second factor that must also be considered in material selection is the overall weight of the rod and handle combination, it being generally desirable to maintain weigh at a minimum without sacrificing structural stability.

In preferred embodiment 10, the entire body member 11 is a single molded piece of hard plastic with a roughened outer surface for better gripping and with the internal cavities formed therein during the molding process. Slide member 26 is also molded from this material, which has been found to be sufficiently rigid and durable to provide a structural sturdy handle and reel seat for normal fishing use without the need for a reinforcing tube. Threads 42 are cut or molded into the outer surface 14 of the preferred embodiment, although an appropriately formed metal ring-like piece could be heat set in the body material during molding, if desired. Washer 41 is rubber and butt cap 27 is metal to provide secure attachment to the body member.

The operation of assembling and disassembling handle and reel seat 10 of the preferred embodiment may be accomplished in two ways:

First, the dimensions of opening 17 and slot 33 may be such that it is possible to insert front reel foot 22 into space 28 and then to turn, or rotate, the T-shaped support at a slight angle to slip the back reel foot through slot 33 and into first cavity 18. Once in, enclosed space 28 and surface 32 on slide 26 will securely seat the reel feet and keep them from slipping during use.

Second, depending once again upon the particular dimensions of second cavity 25 and slot 33, it may be possible to insert the reel feet and T-bar support for the fishing reel into second cavity 25 at butt end 13 of the handle. The support and attached fishing reel can then slide along second cavity 25 into proper position in opening 17 and first cavity 18. The slide member, washer and butt cap will then once again securely seat and support the reel feet, and thus the fishing reel, eliminating any problem of loosening or of the reel becoming dislodged during use.

While the preferred embodiment has been described above with the means for seating 21 associated with the butt end 13 of the handle, reverse positioning of means 21 is also clearly possible and advantageous under certain circumstances. For example, salt-water surfing rods generally have handles 3 to 4 feet in length with the reel seat positioned very near the forward end. A butt end seating means 21 would be possible, although not very practical in view of the required length of slide member 26. Instead, the second cavity 25 and slide member 26 can be readily reversed and mounted in the forward end of the handle along with the rod ferrule. Such a variation is clearly within both the scope and contemplation of the present invention as described and claimed herein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. An improved handle and reel seat for a fishing rod comprising:
   (a) a single grippable body member including a forward end and a butt end thereon, said body member being elongated and having a continuous, generally rounded outer surface in axial cross section, the forward end including a rod-receiving means therein;
   (b) an opening in the outer surface of said body portion connecting with a first cavity therein; and
   (c) means for securely seating the reel feet on a T-shaped fishing reel support within said first cavity;
   (d) a second elongated cavity in said body member extending from the butt end thereof and connecting with said first cavity;
   (e) a removable slide member slidable within said second cavity; and
   (f) a butt cap, said means for seating including means for securely attaching said butt cap to the butt end of said body member with said slide member retained therein and securely supporting the reel feet within said first cavity;
   said first cavity having a converging space forward of said opening and adapted to seat the forward reel foot on the T-shaped reel support; and
   said slide member having a surface sloped upwardly and rearwardly on the forward end thereof and adapted to seat the rear reel foot on the T-shaped reel support;
   said generally rounded outer surface being generally circular, and said second cavity including an elongated slot portion in the outer surface of said body member and extending from the butt end to said opening, said slide member including a corresponding outwardly projecting portion adapted to fit within the slot portion of said second cavity and further having an arcuate outer surface matching the curvature of the generally circular outer surface of said body member.

2. The handle and reel seat in claim 1 wherein said second cavity further includes opposing ledges extending the length thereof and adapted to support corresponding surfaces on said slide member.

3. The handle and reel seat in claim 2 additionally comprising a rubber washer compressible between said butt cap and the butt end of said body member, said washer being adapted to compress said slide member within said second cavity and against the reel feet on the T-shaped reel support when said butt cap is securely attached thereto.

4. The handle and reel seat in claim 3 wherein said butt cap is screwably attached to the butt end of said body member.

5. The handle and reel seat i claim 3 wherein said body member is a single, generally rigid piece of molded synthetic material.

6. The handle and reel seat in claim 3 wherein said body member is a single, generally rigid piece of molded plastic.

* * * * *